United States Patent
Karte

(10) Patent No.: US 7,451,644 B2
(45) Date of Patent: Nov. 18, 2008

(54) METHOD FOR VERIFYING THE PERFORMANCE OF A TEST OF THE FUNCTIONALITY OF A SAFETY VALVE

(75) Inventor: Thomas Karte, Bruchkoebel (DE)

(73) Assignee: Samson AG, Frankfurt (DE)

( * ) Notice: Subject to any disclaimer, the term of this patent is extended or adjusted under 35 U.S.C. 154(b) by 303 days.

(21) Appl. No.: 11/341,192

(22) Filed: Jan. 27, 2006

(65) Prior Publication Data

US 2006/0191314 A1 Aug. 31, 2006

(30) Foreign Application Priority Data

Jan. 28, 2005 (DE) .................. 10 2005 004 277

(51) Int. Cl.
*G01M 19/00* (2006.01)
(52) U.S. Cl. ........................................ 73/168
(58) Field of Classification Search ............... None
See application file for complete search history.

(56) References Cited

U.S. PATENT DOCUMENTS

| | | | |
|---|---|---|---|
| 4,274,438 A | 6/1981 | La Coste | |
| 4,896,101 A | 1/1990 | Cobb | |
| 5,197,328 A | 3/1993 | Fitzgerald | |
| 6,276,385 B1 * | 8/2001 | Gassman | 137/1 |
| 6,678,584 B2 * | 1/2004 | Junk et al. | 700/282 |
| 6,751,544 B2 * | 6/2004 | Hashimoto et al. | 701/107 |
| 6,935,610 B1 | 8/2005 | DeBruyne | |
| 2003/0183194 A1* | 10/2003 | Noguchi | 123/396 |
| 2005/0098960 A1 | 5/2005 | Hoffman et al. | |
| 2006/0119466 A1* | 6/2006 | Flentge et al. | 338/15 |
| 2006/0162783 A1 | 7/2006 | Valentin-Rumpel | |
| 2006/0185418 A1 | 8/2006 | Hoffman | |
| 2006/0266966 A1 | 11/2006 | Karte et al. | |

FOREIGN PATENT DOCUMENTS

| | | |
|---|---|---|
| DE | 196-15-176 | 10/1997 |
| DE | 199-21-828 C2 | 11/2000 |
| DE | 102-09-545 | 10/2003 |
| DE | 19723650 B9 | 4/2004 |
| DE | 103-18-171 | 11/2004 |

* cited by examiner

*Primary Examiner*—Robert R Raevis
(74) *Attorney, Agent, or Firm*—Woodling, Krost, and Rust

(57) ABSTRACT

The invention pertains to a method for verifying the performance of a test of the functionality of an actuator (1) with a drive (2) and a valve (3*a*), where the valve (3*a*) can be moved by the drive (2), which uses a drive element (3) acting on the valve (3*a*); where the drive element (3) and thus the actuating element of the valve can be moved by means of a position controller (5) over a portion of the actuating distance to perform the partial-stroke freedom-of-movement test and thus to test the functionality of the actuator (1), and where the position controller (5) has a distance sensor (7)—the primary sensor—and a first evaluation unit (8) for evaluating and storing the signals of the distance sensor (7). According to the invention, a second evaluation unit (13*a*) is used, which detects the movement of the actuator (1) and simultaneously acquires and records a protocol of this movement, and in that a second sensor (11) connected to the second evaluation unit (13*a*) is used independently to detect the movement of the actuating element.

20 Claims, 3 Drawing Sheets

METHOD FOR VERIFYING THE PERFORMANCE OF A TEST OF THE FUNCTIONALITY OF A SAFETY VALVE

The invention pertains to a method according to the introductory clause of Claim 1.

In safety-oriented industries, especially in the chemical and power generation industries, safety valves must be tested regularly to ensure that they are operating properly.

In contrast to control valves, which are operated automatically by position controllers as needed, safety valves often remain open for years or possibly forever, because they are used only in emergencies.

DE 103 18 171 A1 describes a control valve which is connected by a drive element to an actuator. To determine the position of the drive element and thus of the actuator, the drive element is in working connection with a measuring transducer. This transducer comprises a first distance sensor based on a certain measuring principle. A second sensor is also present, which uses a measuring principle different from that of the first sensor. The first sensor is a contactless distance sensor, whereas the second sensor is a potentiometer sensor.

The "partial-stroke" test method is a known way of testing the functionality of safety valves. To check the ability of the valve to function properly, the actuator of the valve is briefly moved over a portion of its actuating distance. The safety valve is thus, in practice, closed to a certain degree, while the plant remains in operation.

It is possible in this way to determine, for example, whether a valve is blocked unacceptably, whether a spring of the actuator or of the valve is broken, whether corrosion is present on a valve ball, or whether undesirable crystallization has occurred on the valve. The method can be used both for valve elements which move in linear fashion and for those which rotate.

When a safety valve is to be tested by a technical control board such as the TÜV [Technischer Überwachungsverein], proof must be provided that a freedom-of-motion test or partial-stroke test has taken place or has been completed successfully. The safety valve must therefore be tested in such a way that this can be certified or validated by a technical control board such as the TÜV.

By implementing measures of this kind, it is possible to minimize the risk that a valve will malfunction in an actual emergency. The risk that a hazardous situation will develop can thus be reduced. The extent of the risk can be estimated on the basis of IEC 61 508/IEC 61511. The test data, however, must be validated before it can be concluded that the performance of the partial-stroke method has in fact reduced the risk.

The partial-stroke method is best conducted automatically by a device which is mounted in the field, that is, next to the valve to be tested. This device can be, for example, a position controller with appropriately customized software. Because of the need to prevent explosions, however, such position controllers have very limited electric power supplies and therefore very limited computing power. Thus the measures which must be taken to validate and to certify the software present in the position controller are very expensive. This validation, however, is in fact necessary so that the test data generated by the position controller during the performance of the partial-stroke test can be validated.

U.S. Pat. No. 4,274,438 describes a method of the general type in question with the features of the introductory clause of Claim 1. An electronic servo controller controls a hydraulic spool valve as a function of the difference between a predetermined position of the actuator and the actual position determined by a distance sensor. A hydraulic drive is also provided, which moves the actuator. A pressure sensor detects the hydraulic control pressure in the drive. The signals of the hydraulic control pressure and the signals of the distance sensor are stored in a recording mechanism.

A method corresponding to the just-cited U.S. Pat. No. 4,274,438 is also known from U.S. Pat. No. 5,197,328.

U.S. Pat. No. 4,896,101 describes a valve with an electrically powered actuator. To obtain the control data of the actuator, the current and the applied voltage are recorded and shown on a display device. The closing position of the actuator is also determined on the basis of the current and voltage data. The closing position of the actuator is also verified by sensors, which measure the noise level in the valve. All these data are sent to an evaluation unit, where they are compared.

A method for monitoring motor-driven valve elements is known from DE 196 15 176 A. The evaluation unit disclosed there is connected to an external data recording device via an interface.

DE 102 09 545 A discloses a method for acquiring valve data in which operating data and/or parameters of state are recorded and conclusions concerning the technical functionality of the valve are drawn. The time stamps of the acquired data are used here as a reference variable in the analysis of the acquired data.

The invention is based on the task of providing a method which makes it possible to validate test data with little effort and which also allows the data to be certified in an uncomplicated manner.

This task is accomplished by a method according to Claim 1.

Additional advantages and features of the invention form the objects of the subclaims.

According to the invention, a second evaluation unit is used, which detects the movement of the actuator and simultaneously with this detection creates and records a protocol of the movement. A second sensor, connected to the second evaluation unit, is used to detect the movement of the actuator independently. As a result, the movement of the actuator can be detected by a sensor which operates independently of the primary control system or independently of a primary microcomputer.

The inventive method makes it possible, in practice, to present technical, certifiable proof of the successful completion of a partial-stroke test. The advantages of the partial-stroke test can thus be fully exploited. As a result, frequent testing of the actuator or of the safety valve is possible without the need to interrupt the operation of the plant.

By the use of the invention, the movements of the actuator can be detected and recorded without being falsified by possible software errors. The important point here is that it is also possible to obtain the information that a position controller has actually performed the freedom-of-movement test.

Thanks to the invention, it is not necessary to obtain complete certification of the entire software program of the position controller. Such complete certification would take a disproportionately large amount of effort. By verifying the actual movement of the actuator, it is possible, by arguing in reverse, to conclude that the diagnostic data generated by the software are valid. These diagnostic data can be in the form of, for example, a distance-time graph of the movement of the actuators, a curve of the change in pressure in the drive, etc., or they could also pertain to parameters derived from such data.

The position controller used ensures that the safety valve closes in a defined manner. Moving valves with the help of position controllers is effective especially in the case of valves with short operating times, i.e., on the order of two seconds, for example. A position controller with the first distance sensor according to the invention can be controlled more accurately than a small drive in the form of a magnetic valve. When a magnetic valve is used in place of a position controller, the method can still be applied effectively if the drive is large.

An inductive sensor, for example, can be used as the second sensor. In professional safety circles, sensors of this type are already recognized by technical control boards (TÜVs). It is also possible to use other measuring principles, however, such as potentiometric or optical methods or to use magnetic field sensors. The sensing can be of the switching type or analog. The second distance sensor detects in particular only whether or not the safety valve has reached its desired closing position, e.g., a 90% position, during the freedom-of-movement test (partial-stroke test). If this is the case, the corresponding signal will be sent to the second evaluation unit or to the second control unit.

It is advisable to use an inductive limit switch as the second sensor. The input signal to the additional evaluation unit or electronic circuit is thus a redundant sensor signal. A switch or contactor is sufficient, because only a yes-no answer is required for certification.

Alternatively, however, the primary sensor, especially a limit switch or an inductive limit position switch, can be used to supply a signal to the additional evaluation unit. Instead of using a second inductive limit position switch, therefore, to record the movement of the actuator in analog or digital fashion, the movement can be detected by a single sensor, which comprises a primary computer and an additional electronic circuit. The signal of the primary distance sensor of the position controller is therefore used as the input signal to the additional circuit. It is a good idea here to monitor this sensor in the manner described, for example, in DE 199 21 828.

It is especially advantageous for each of the signals stored locally in the position controller and each of the signals stored in the second evaluation unit to be acquired with a time stamp. The simultaneity of two signals provides proof of a valid partial-stroke test. As a result, furthermore, parameters and signals determined for this test by the software of the position controller such as lag time, rise time, distance-time graphs, etc, can be recognized as valid data and/or evaluated as valid with a correspondingly high level of probability. A time stamp is a kind of internal clock, which shows when the signal was generated. The clock time at which a signal occurs is stored and can be read out as desired. Both the test data and the diagnostic data in the first evaluation unit and the records of the signals in the second evaluation unit are therefore acquired with the times of occurrence (time stamping) of the events in question. Proof of the authenticity of the diagnostic data generated in the first evaluation unit is established in practice by comparison of the time registration of the data registered in the one evaluation unit with the time registration of the data in the other unit.

As an alternative to the comparison of the two signals on the basis of their time stamps, it is possible to compare them on the basis of a so-called "signature". A feature is impressed onto the test signal which is transmitted to the valve by the position controller; this feature must be found again in the signal recorded by the second evaluation unit. For this purpose, for example, a sequence of three test strokes in rapid succession with a gap of five seconds between the first test stroke and the second and with a gap of two seconds between the second test stroke and the third can be used. The signal recorded by the evaluation unit must therefore show a total of three test strokes with the correct intervals of five and two seconds between them. Proof of the authenticity of the diagnostic data generated in the first evaluation unit is therefore also possible by comparison with the diagnostic data stored in the second evaluation unit on the basis of a signature.

So that regular tests can be carried out or scheduled test dates can be observed and additional tests can be carried out when necessary, it is advantageous for the partial-stroke test to be carried out as desired either manually or automatically by means of a timer.

Additional advantages and features of the invention can be derived from the description of the figures in conjunction with the drawing.

Figure 1:
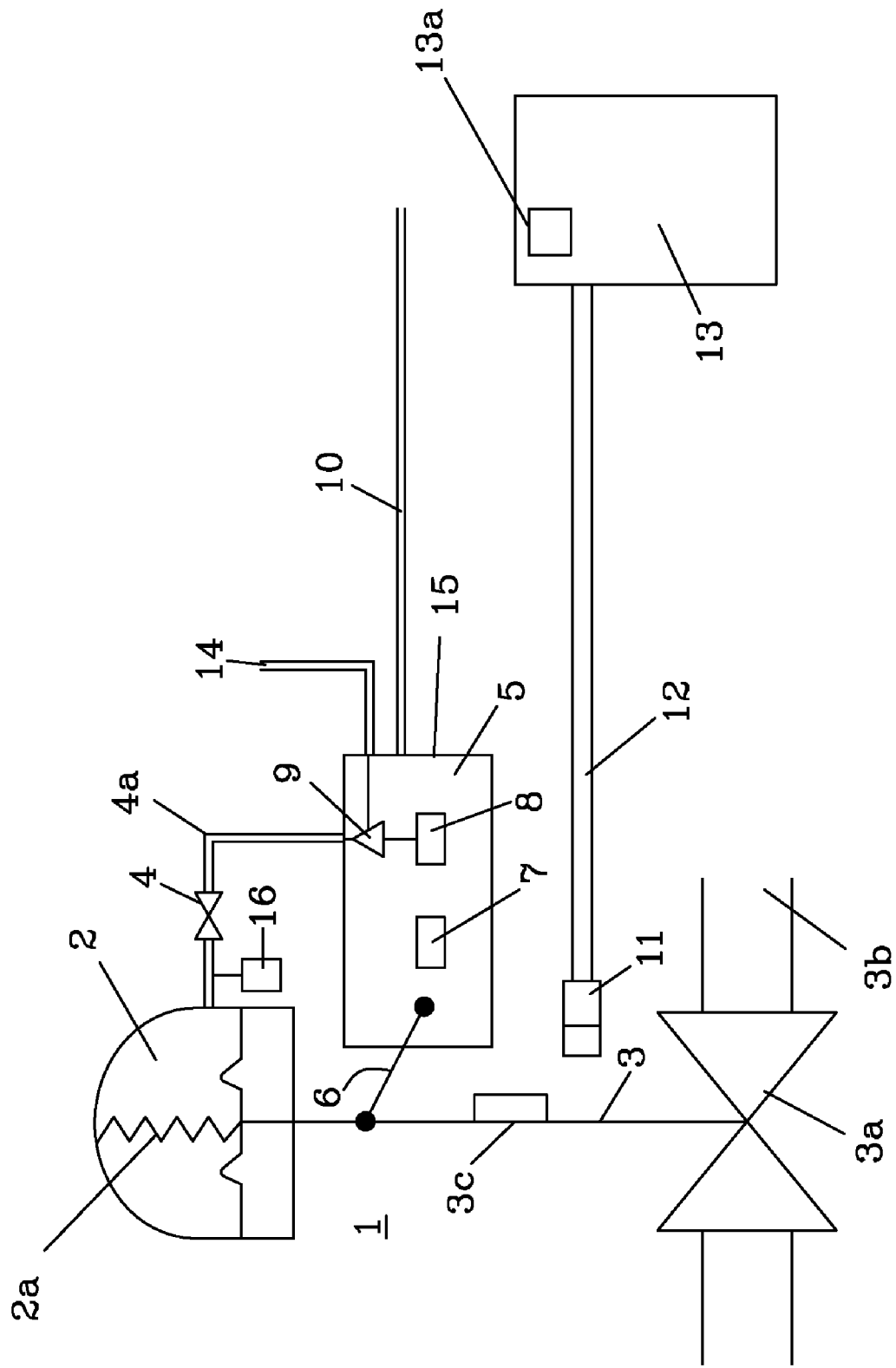
FIG. 1 shows a schematic diagram of a valve arrangement with an actuator and a position controller in conjunction with a second distance sensor with safety-oriented control.

FIG. 1 shows an actuator 1, which has a pneumatic drive 2 with a spring-operated reset mechanism—restoring spring 2a. The drive 2 causes a drive element, in this case a pushrod 3, to perform translational movement. The pushrod is connected to an actuating element (not shown) of a valve 3a. It is also possible to provide a drive element for a pivoting drive for a correspondingly designed actuator.

The valve 3a is a safety valve, installed, for example, in a pipeline 3b leading to or from a reactor of a power plant. Another valve, namely, a main valve (not shown here), is also installed in the pipeline 3b to control the fluid stream passing through the pipeline. The valve 3a is controlled by a position controller 5, as a result of which the valve 3a can influence the fluid stream.

The safety valve 3a is installed in a safety-oriented circuit and can be used not only in a power plant but also, for example, in a chemical plant. The safety valve 3a is actuated only in emergencies and otherwise remains open.

In addition, tests are conducted to determine the functionality of the safety valve 3a, as will be described later on.

The pneumatic drive 2 of the actuator 1 of the valve 3a is connected by a pneumatic line 4a to the position controller 5. A magnetic valve 4, controlled by a command system, is installed in the pneumatic line 4a.

To detect the position of the actuating element of the valve 3a by way of the pushrod 3 of the actuator 1, the pushrod 3 cooperates by way of a mechanical position signaler 6 with a first distance sensor 7 of the position controller 5. The first distance sensor 7 is connected to a data acquisition and processing unit 8—the first evaluation unit—of the position controller 5 with local memory, which acts in turn on a current-to-pressure converter 9 of the position controller 5 as a function of, for example, the actual position of the actuator and predetermined nominal values. The actuating drive 2 is then operated by way of the current-to-pressure converter 9.

So that nominal values can be entered and actuating element position data can be accessed, the position controller 5 is provided with a two-wire communications line 10, via which the position controller 5 is driven with 4-20 mA current, upon which digital communications can be superimposed if desired. The two-wire communications line 10 is connected to a command system (not shown), which controls the reactor or the chemical plant and thus regulates the processes of this plant. Instead of transmitting signals by the use of 4-20 mA current, however, it is also possible to connect the position controller to a higher-level control and maintenance system by means of a field bus (e.g., "Profibus", Fieldbus Foundation) or some other type of system.

The position controller 5 is also connected to a pneumatic source by a supply line 14, so that actuating drive 2 can be operated pneumatically as a function of the actuating signals.

Another position signaler 3c in the form of, for example, a metal flag, is attached to the pushrod 3. This flag cooperates with a second distance sensor 11 to determine a predetermined position of the pushrod 3 and thus the position of the actuator of the valve 3a. The second distance sensor 11 is designed as an inductive limit switch. Via signal lines 12, the second distance sensor 11 interacts with a control unit 13 with safety-oriented software; this control unit includes a second evaluation unit 13a.

Figure 2:
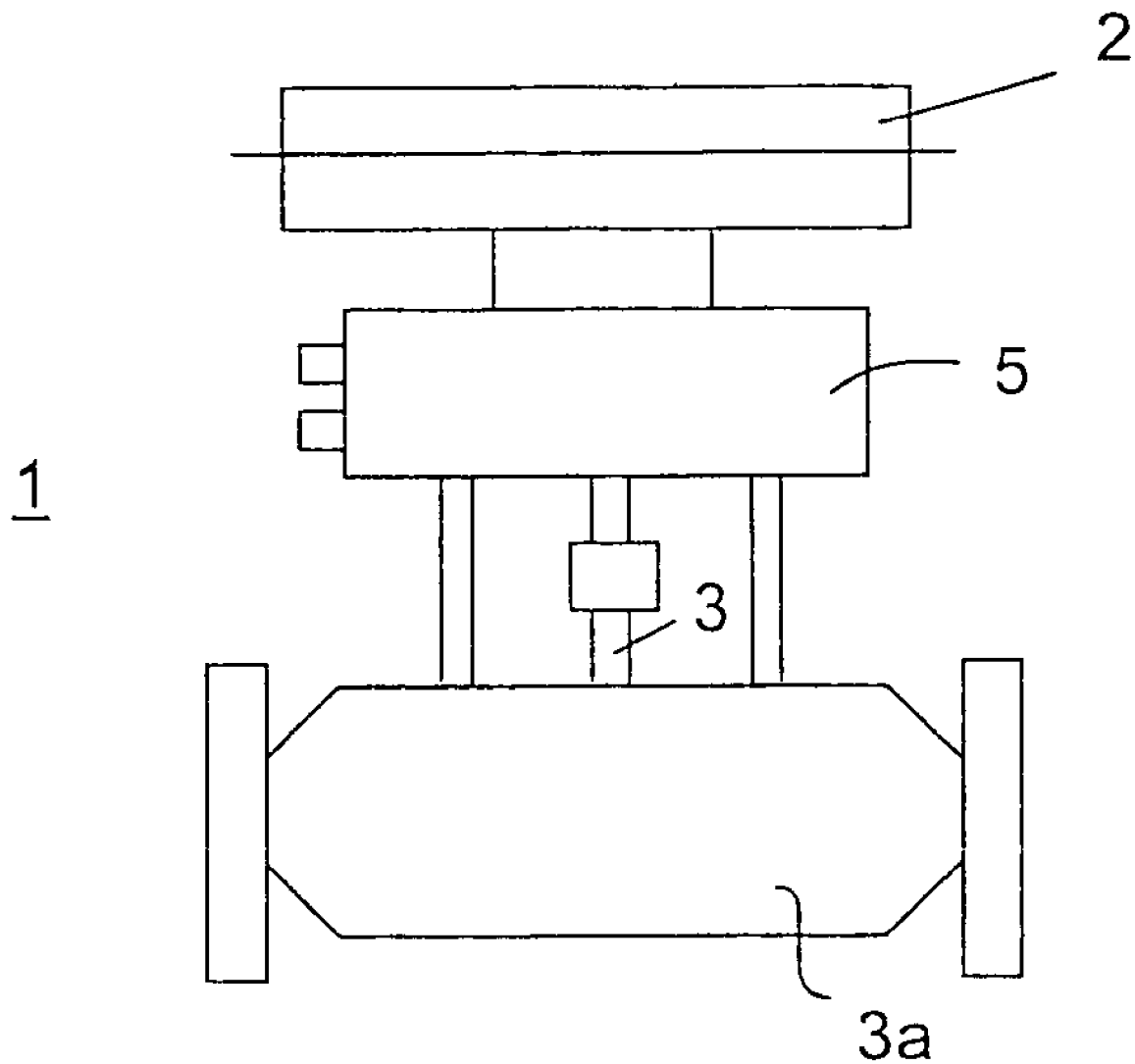
FIG. 2 shows a schematic diagram of a control valve.

The actuator 1 is shown in schematic fashion in FIG. 2. The position controller 5 is mounted on the actuator 1. The actuator 1 is provided with a valve element. The position controller 5 is installed in the electronic circuit housing 15 and attached with it to the actuator, but other types of mounting are possible, such as those according to NAMUR.

The first evaluation unit, that is, the data acquisition and processing unit 8 with local memory, of the position controller 5 is provided with its own local software. In contrast to the software of the safety-oriented control unit 13, that is, of the second evaluation unit 13a, this local software does not have to be validated.

The position controller 5 transmits the result of a function test in the form of, for example, a distance-time graph or derived parameters in either a synchronous or asynchronous manner to a higher-level Asset Management System of the command system. If asynchronous transmission is used, the position controller must have a local data memory unit, which is not shown in FIG. 1.

In the course of a test, the position signaler 3c activates the second distance sensor 11, which is designed as an inductive limit switch. The second sensor sends the corresponding signals to the control unit 13 containing the second evaluation unit 13a. The control unit 13 with the second evaluation unit 13a is installed in a control room a long distance away. Because it may demand a large amount of energy, it does not make sense to install the control unit locally on the position controller 5. The position controller 5 with the data acquisition and processing unit 8, however, is installed directly in the electronic housing 15 of the actuator 1.

This second sensor 11 and a method for detecting the position or the functionality of the safety valve 3a can be approved by a recognized control board (TÜV).

Figure 3:
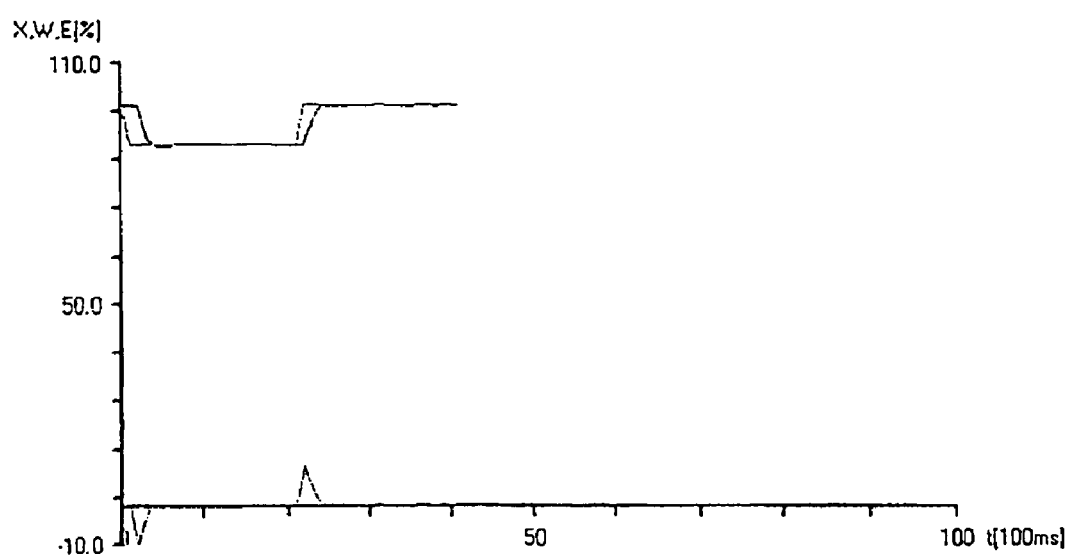
FIG. 3 shows a time diagram of the control movement of a control valve during a partial stroke test procedure.

The partial-stroke test method is used to test the valve 3a, as illustrated in FIG. 3. Briefly, that is, for a time in the range of 100-1,000 msec (here, in the present example, approximately 200 msec), the actuating element is closed from a 100% open position to a 93% open position. The position of the valve is changed advisably by up to 10% (that is, in the range from 100% to 90%). It can thus be determined whether or not the valve is blocked or corroded or is suffering from some other defect or whether the actuator has a defective restoring spring 2. This can be done without having to interrupt production operations in the reactor or in the chemical plant. During the partial-stroke test, therefore, the actuating element or the drive element 3—the pushrod—which is connected to the actuating element is briefly moved over a certain portion of its actuating distance to test its functionality and the freedom of movement of the drive train and thus the functionality of the valve 3a.

According to the invention, the partial-stroke test method is used to verify the performance of a test of the functionality of the valve 3a. In this method, an additional evaluation unit 13a, as part of the control unit 13 with validated software, is used to validate and in particular to certify the functionality test by comparing its own signal with the result of the first evaluation unit 8, that is, by comparison of two independently acquired and evaluated signals.

One signal is transmitted by the primary evaluation unit 8. The other signal is recorded by the second evaluation unit 13a of the control unit 13 independently of the first unit. The signals stored locally in the position controller 5 and the signals stored in the second evaluation unit 13a of the control unit 13 are also acquired with time stamps.

The second sensor 11 connected to the additional evaluation unit 13a can be used independently to detect the movement of the actuating element, as illustrated in the figures, but it is also possible to use the primary distance sensor 7 to supply the additional evaluation unit with signals. Both methods are possible.

The independent sensor signals (in the case of two sensors, those of the first distance sensor 7 and those of the second distance sensor 11) are recorded independently of each other.

Signal curves and/or signal data of the partial-stroke test can be printed out by a suitable printing device.

The terminals of the position controller 5 of the actuator 1 for the valve 3a could be allocated as follows, by way of example: The limit switches or the one limit switch (first distance sensor 7) and the magnetic valve 4 are integrated into the position controller 5. The position controller 5 can be used in addition to or in place of the magnetic valve 4.

Alarm contacts can be provided in the position controller 5, so that alarm signals can be given in the event of a malfunction.

The drive signal of the internal analog current-to-pressure converter 9 can be recorded.

In addition, the pressure in the actuating drive 2 of the actuator 1 can be recorded independently by an additional pressure sensor.

The inventive partial-stroke test can be performed either manually or automatically by means of a timer, as desired. The partial stroke can be initiated either by means of a so-called HART protocol or by on-site operation.

By means of the invention, a signal chain consisting exclusively of certified components (limit switches, a standard input of the safety-oriented SPS, software) can be created, and thus an incident can be detected with certainty and by the use of standard, time-tested, commercial components.

LIST OF REFERENCE NUMBERS 1 actuator
2 pneumatic drive with spring-operated reset
2a restoring spring
3 pushrod
3a valve, safety valve
3b pipeline
3c position signaler for the second distance sensor
4 magnetic valve
4a line
5 position controller
6 mechanical position signaler
7 distance sensor of the position controller—first distance sensor
8 data acquisition and processing unit of the position controller with local memory, first evaluation unit
9 current-to-pressure converter of the position controller
10 two-wire communications line
11 second distance sensor
12 signal lines
13 safety-oriented control unit with validated software
13a second evaluation unit 14 pneumatic supply of the position controller
15 electronic component housing
16 presssure sensor

The invention claimed is:

1. Method for verifying the performance of a partial-stroke-freedom-of-movement test on valve (3a), said valve (3a) controlled by an actuator (1), utilizing a drive (2), a drive element (3), an actuating element, a position controller (5), said position controller includes a first distance sensor (7), a first evaluation unit (8), a second distance sensor (11), and, a second evaluation unit (13a), comprising the following steps:
   moving said valve (3a) with said drive (2), said drive uses said drive element (3) to act on said valve (3a), said drive element is connected to said actuating element, said drive element capable of moving said valve (3a) an actuating distance;
   moving said drive element (3) including said actuating element with said position controller (5) over a portion of said actuating distance;
   evaluating and storing signals from said first distance sensor (7) with and in said first evaluation unit (8);
   detecting, independently, movement of said drive element (3) of said actuator (1) using said second distance sensor (11), said second distance sensor (11) connected to said second evaluation unit (13a); and,
   acquiring and recording, simultaneously, movement of said drive element (3) of said actuator (1) as sensed by said first and second distance sensors (7, 11).

2. Method according to claim 1 wherein an inductive limit switch is used as the second sensor (11).

3. Method according to claim 2, wherein said first distance sensor (7) also supplies signals to said second evaluation unit (13a).

4. Method according to claim 2, wherein recording of said sensor signals is accompanied also by a printout of said signal curves and/or signal data.

5. Method according to claim 1, wherein said sensor (7) supplies signals to said second evaluation unit (13a).

6. Method according to claim 1, wherein said position controller (5) locally stores signals received from said first distance sensor (7), said second evaluation unit (13a) stores signals received from said second distance sensor (11), and each of said signals from said distance sensors (7, 11) are time stamped.

7. Method according to claim 1, wherein said drive (2) is a pneumatic drive; and said pneumatic drive includes a magnetic valve (4) in pneumatic line (4a) which feeds said pneumatic drive.

8. Method according to claim 1, wherein said drive element (3) is a pushrod.

9. Method according to claim 1, wherein said drive element (3) is a driven shaft of a pivoting drive.

10. Method according to claim 1, wherein said second evaluation unit (13a) records the change over time in both the movement of said actuating element and of the magnitude of the corresponding actuating signal.

11. Method according to claim 1, wherein said position controller 5 includes an analog current-to-pressure converter (9), said analog current of said current to pressure converter is recorded, and said current-to-pressure converter (9) controls the pneumatic pressure applied to said pneumatic drive (2).

12. Method according to claim 1, further comprising a pressure sensor, said pressure sensor is used to produce an independent recording of the pressure in the drive (2).

13. Method according to claim 12, wherein diagnostic data include pressure data of said drive (2) are generated.

14. Method according to claim 1, wherein said partial-stroke test is performed and said partial-stroke test is timed.

15. Method according to claim 1, wherein said second evaluation unit (13a) is installed remotely from the first evaluation unit (8).

16. Method according to claim 1, further comprising a housing (15), said position controller (5) and said second evaluation unit (13a) are provided in said housing (15).

17. Method according to claim 1, wherein said recording of said sensor signals occurs and is accompanied by a printout of said signal curves and/or signal data.

18. Method according to claim 1, wherein the validity of said diagnostic data acquired and generated in said first evaluation unit (8) is compared to diagnostic data acquired in said second evaluation unit (13a).

19. Method according to claim 18, wherein said data is time stamped enabling comparison of said data.

20. Method according to claim 18, wherein each said test includes a signature, said signature includes chronological sequences of several individual tests.

* * * * *

UNITED STATES PATENT AND TRADEMARK OFFICE
CERTIFICATE OF CORRECTION

PATENT NO. : 7,451,644 B2
APPLICATION NO. : 11/341192
DATED : November 18, 2008
INVENTOR(S) : Thomas Karte It is certified that error appears in the above-identified patent and that said Letters Patent is hereby corrected as shown below:

Col. 7, line 3, after "16" delete "presssure." and insert --pressure--.

Signed and Sealed this

Eleventh Day of August, 2009

David J. Kappos
*Director of the United States Patent and Trademark Office*